US010484649B2

(12) United States Patent
Paripally et al.

(10) Patent No.: US 10,484,649 B2
(45) Date of Patent: Nov. 19, 2019

(54) MOBILE WEARABLE VIDEO CONFERENCING SOLUTION

(71) Applicant: Polycom, Inc., San Jose, CA (US)

(72) Inventors: Gopal Paripally, Hyderabad (IN); Pavan Pakala, Hyderabad (IN); Pravin Karandikar, Pune (IN); Venkata Satya Anil Kumar Neeli, Telangana (IN); Sharath Naeni, Telangana (IN)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 16/028,297

(22) Filed: Jul. 5, 2018

(65) Prior Publication Data

US 2019/0037174 A1 Jan. 31, 2019

(30) Foreign Application Priority Data

Jul. 31, 2017 (IN) .............................. 201731027186

(51) Int. Cl.
*H04N 7/15* (2006.01)
*H04N 7/14* (2006.01)
*H04N 5/225* (2006.01)

(52) U.S. Cl.
CPC ............... *H04N 7/15* (2013.01); *H04N 7/142* (2013.01); *H04N 7/147* (2013.01)

(58) Field of Classification Search
CPC combination set(s) only.
See application file for complete search history.

(56) References Cited

U.S. PATENT DOCUMENTS

| 7,278,734 | B2* | 10/2007 | Jannard | G02C 3/003 |
| | | | | 351/158 |
| 7,798,638 | B2* | 9/2010 | Fuziak, Jr. | G02B 27/0172 |
| | | | | 345/7 |
| 2012/0075168 | A1* | 3/2012 | Osterhout | G02B 27/017 |
| | | | | 345/8 |
| 2016/0328021 | A1* | 11/2016 | Lee | G06F 3/011 |

* cited by examiner

*Primary Examiner* — Phung-Hoang J Nguyen
(74) *Attorney, Agent, or Firm* — Blank Rome, LLP

(57) ABSTRACT

A wearable telecommunications device enabling a user to engage in teleconferencing activity from nontraditional locations, while allowing the user free use of his hands. The wearable telecommunications device houses a plurality of input and output devices removably attached to the body of the wearable device. The input and output devices generally include one or more cameras, motion sensors, at least one microphone, and at least one power source. The housing generally consists of wearable headgear such as a helmet. The headgear will have a smaller display near the user's right or left eye, and can also have a larger display mounted on the exterior, whereby others can view information, or the user can view information.

19 Claims, 5 Drawing Sheets

MOBILE WEARABLE VIDEO CONFERENCING SOLUTION

CROSS-REFERENCE TO RELATED APPLICATION

This application claims priority to India Provisional Application No. 201731027186, entitled MOBILE WEARABLE VIDEO CONFERENCING SOLUTION, and filed Jul. 31, 2017, the contents of which are entirely incorporated by reference herein.

TECHNICAL FIELD

This disclosure is generally concerned with videoconferencing, and more specifically to modular videoconferencing equipment which can be worn by a user, enabling the user to participate in a conference without interfering with the user's mobility and the use of his hands.

BACKGROUND

There are situations where it can be desirable to have full teleconferencing functionality at an endpoint other than a traditional meeting room or office. Attempts at providing this functionality include carts bearing equipment, and large suitcase-like carriers. These prior solutions have thus been large and unwieldy.

SUMMARY

Embodiments of this disclosure include wearable headgear incorporating multiple teleconferencing components. The headgear unit can enable the wearer to engage in teleconferences from untraditional environments, such as in emergency situations, combat situations, and close quarter areas like mines. Embodiments include videoconferencing solutions (VCS) which are rugged and lightweight, and allow users use their hands to perform tasks other than managing the VCS. In accordance with at least one embodiment, a mobile wearable video conferencing solution (MVS) includes at least one eyepiece which has a display unit therein. A MVS user can view information rendered on a display surface, such as images of participants at a remote endpoint, or views from one or more remote cameras. For example, a soldier might view video collected by a camera mounted on a friendly vehicle which is closer to an enemy position, thereby allowing the soldier to "see the other side of the hill" better than would otherwise be the case. At least one embodiment is an MVS which includes one or more additional display units externally mounted on the MVS housing which can be viewed by others or viewed by the user when operating the MVS in an unworn configuration.

BRIEF DESCRIPTION OF THE DRAWINGS

The drawings show various aspects and example embodiments of the technology described herein. In the drawings, like numerals indicate like elements throughout. As the purpose of the drawings is to illustrate and help explain the concepts of this disclosure, the inventions disclosed herein are not limited to the precise scale, arrangements, dimensions, and instruments shown. In the drawings.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present encompass such modifications and variations.

Descriptions of terms used within this disclosure are provided as follows. 'Coupled' refers to components or devices which able interact with one another, either directly or indirectly. All connected elements are coupled, but not all coupled elements are connected. Coupled elements include those which are in communication with each other. 'Proximity' refers to the degree to which items or elements or components etc. are close to one another. Elements are 'proximate' when they are near each other, as would be understood based on their context by a person of skill in the art.

The technology described herein can be used in video conferencing environments which include one or more advanced camera devices such as smart cameras.

At least one embodiment of this disclosure is a portable video-audio communication device having a small form factor. A video-audio communication device can be built into gear which to be worn by a person, such as head gear like a helmet. At least one goal of this disclosure is to provide a means whereby a user at work in the field can maintain of audio and video communication with other persons remotely located. Examples field of work include, but are not limited to emergency rescue operations, natural calamity/disaster management, remote patient monitoring on a highway/disaster area (Mobile Responders), supervising construction work, industrial work sites, and underground mining work.

At least one embodiment of this disclosure is a mobile wearable videoconferencing solution (MVS) capable of delivering audio, video communication with remote parties/endpoints. The MVS may operate over plurality of communication channels, such as WiFi™, 3G/4G™ or LTE™ and Mobile networks such as WiMAX™. At least one embodiment operates on multiple of power sources including a rechargeable battery and or an AC/DC power source.

At least one embodiment is an MVS has a memory storing software executable by main processing module (computer/tablet/phone device) which is responsible for running algorithms for establishing calls and other communications.

In at least one embodiment, actuable controls, which are coupled to control units within the MVS, are built into touch glass and/or tactile remote control devices mountable on a wrist and/or arm, and actuable to control components of the MVS.

Figure 1A:
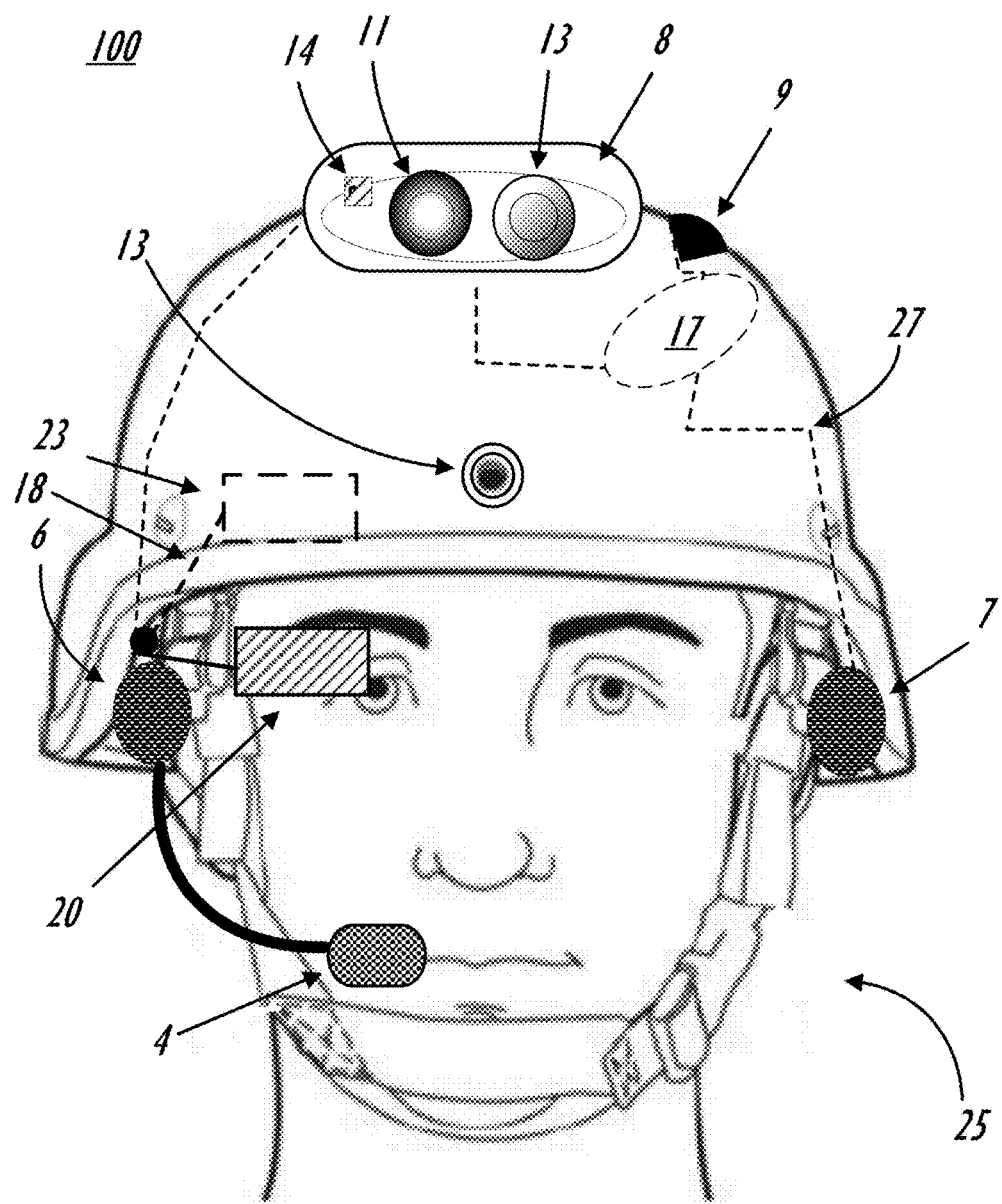
FIG. 1A is a front view of a mobile wearable videoconferencing solution in accordance with an embodiment of this disclosure.

FIG. 1A is a front view of a mobile wearable videoconferencing solution (MVS) 100 in accordance with an embodiment of this disclosure. In the embodiment shown in FIG. 1A, the mobile wearable videoconferencing solution 100 comprises a helmet 2. Sitting atop the helmet 2 is a camera device 8. Camera device 8 of FIG. 1A includes two cameras 11, 12, at least one of which can be an infrared camera 12 and/or a spotter camera 12 used to control an adjustable camera 11. The helmet 2 shown also includes a long range lens 15 and sensor 14. Sensor 14 can be a motion sensor or a proximity sensor, for example. Additional sensors can also be included. The conferencing unit 2 includes two speakers 6, 7 mounted near a user's 25 ears, and at least partially within the inner portion of the conferencing unit 2. The speakers 6, 7 can be used to hear speaker's at a remote endpoint, such as a conferencing room or another MVS 100. Also included is display unit 20, which is positioned near the upper corner on the right side of the user's 25 right eye. The display unit can be positioned such that it does not occlude more than 20% of the user's area of vision in his right eye. The display unit 20 can be adjustably attached to the unit body 2 by an adjustable arm 18 so that the display unit 20 can be moved to a position 23 where the display unit 20 will not occlude the wearer's 25 vision. The display unit 20 can be configured to display a picture in picture video feed.

The helmet 2 can also include a transceiver antenna 9 used for two way communication with a remote endpoint. Each of the components described can be coupled to control unit 17 through wiring 27 interleaved between layers of the material, such as Kevlar®, of which the helmet 2 is made.

Figure 1B:
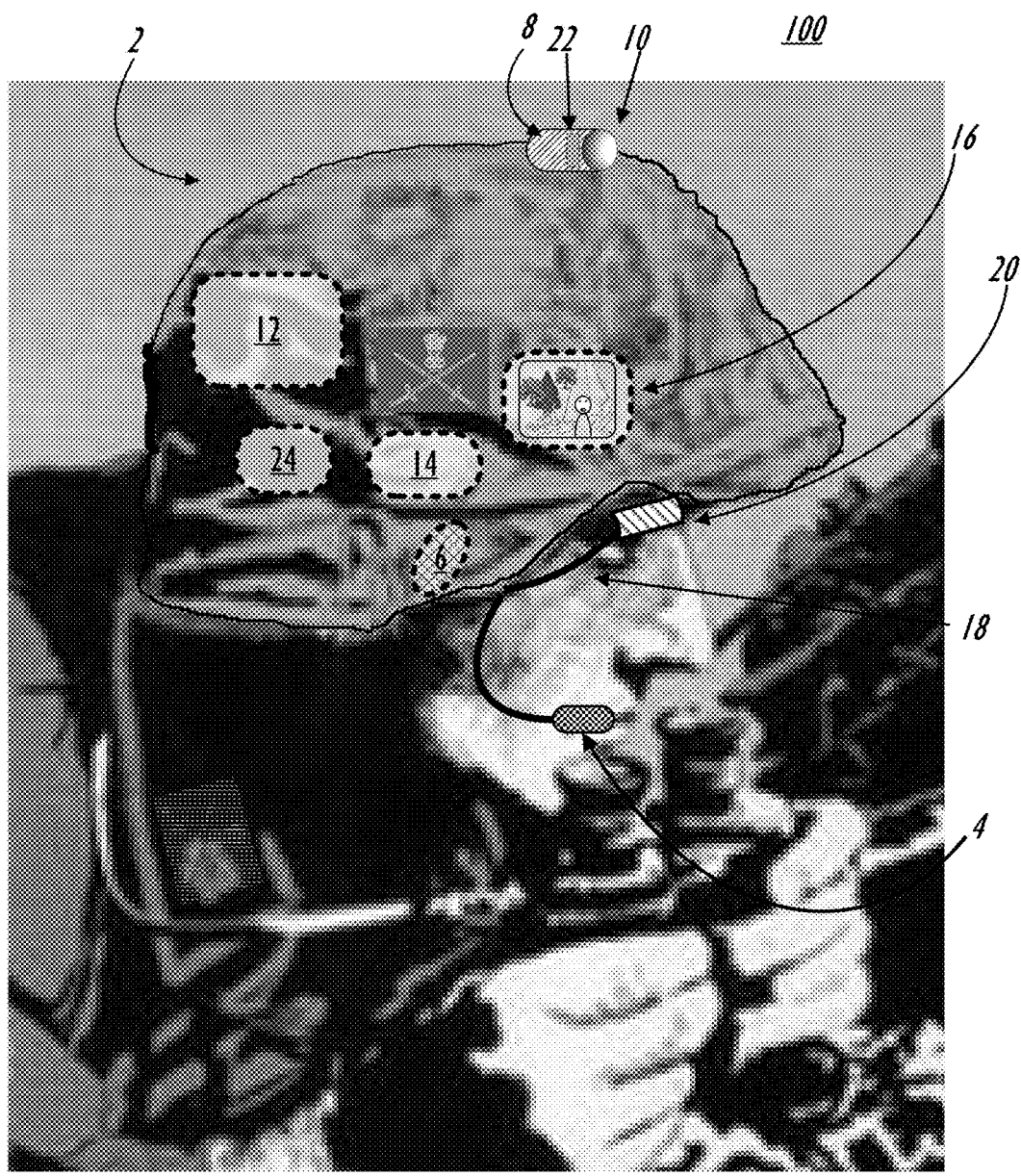
FIG. 1B is a side view of a mobile wearable videoconferencing solution in accordance with an embodiment of this disclosure.

FIG. 1B shows a side view of a MVS 100 in accordance with an embodiment of this disclosure. As was the case in FIG. 1A, the display unit 20 is adjustably held in place by an extendible arm 18, and the microphone 4 is positioned near the user's 25 mouth. The MVS includes internal speakers (e.g., speaker 6). The camera device 8 shown has an occluding cover 10, which can be manually positioned to open or close over the camera(s) 11, 12. A detector 32 is mounted on camera device 8, and is used to detect the physical position of cover 10. In the embodiment shown in FIG. 1B, the main processing module 12 is mounted at back of the MVS 100, while battery 14 is positioned separately to enable it to be easily removed. Also included in the MVS 100 is a second display 16, which is larger than the repositionable display unit 20. Display unit 16 can be used to view meeting participants at a remote endpoint just as display unit 20 can. As will be explained in greater detail below, the MVS 100 can be configured to permit display of remote meeting participants when the unit 100 is operating in "on-table" mode (a/k/a "stationary mode"). A motion sensor 14 is also mounted on or at least partially housed within MVS 100. Motion sensor 14 can be used to provide detailed positional detail to the user or to those at a remote endpoint.

Figure 2A:
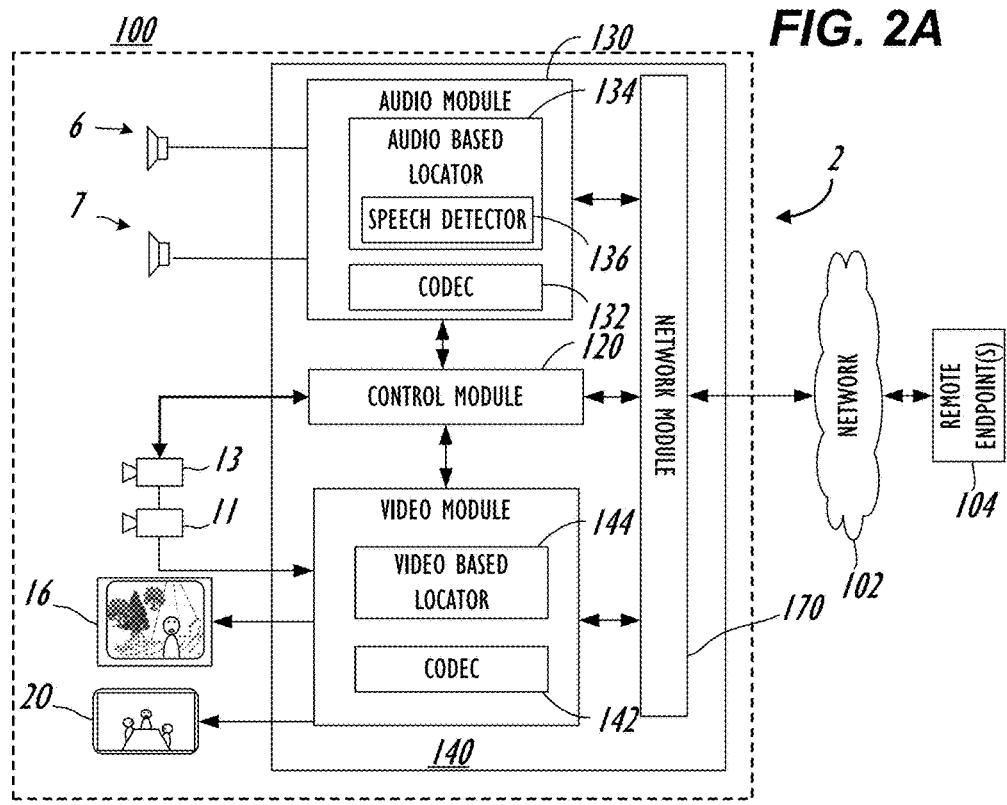
FIG. 2A is a block diagram illustrating components a mobile wearable videoconferencing solution in accordance with an embodiment of this disclosure.

FIG. 2A is a block diagram illustrating components of an example MVS 100. These components can be housed in and/or mounted on various locations throughout the MVS housing 2. The MVS 100 of FIG. 2A communicates with one or more remote endpoints 104 over a network 102. The remote endpoints could include, for example, a traditional meeting room and/or other MVSs worn by other individuals. In the embodiment shown, the MVS 100 has an audio module 130 with an audio codec 132 and has a video module 140 with a video codec 142. These modules 130, 140 operatively couple to a control module 120 and a network module 170.

Adjustable camera(s) 11 captures video and provides the captured video to the video module 140 and codec 142 for processing. Additionally, microphone 4 captures audio and provides the audio to the audio module 130 and codec 132 for processing. The MVS 100 uses the audio captured with microphones 4 primarily for conference audio.

After capturing audio and video, the MVS 100 encodes them using any of the common encoding standards, such as MPEG-1, MPEG-2, MPEG-4, H.261, H.263 and H.264, and the network module 170 outputs the encoded audio and video to the remote endpoints 104 via the network 102 using any appropriate protocol. Similarly, the network module 170 receives conference audio and video via the network 102 from the remote endpoints 104 and sends these to their respective codecs 132/142 for processing. Speakers 6, 7 output conference audio, and display 16, 20 outputs conference video. Many of these modules are distributed in regions in the MVS, such as near the control (processing) units 12, 17. Processing functions can be shared by units 12 and 17 which are coupled to one another. In some embodiments, one control unit can act as a backup/redundant processing unit, to be activated should the other become damaged or rendered in operable.

For the disclosed MVS 100, the adjustable camera(s) 11 can be a steerable Pan-Tilt-Zoom (PTZ) camera or an Electronic Pan-Tilt-Zoom (EPTZ) camera. Either way, the adjustable camera(s) 11 can be adjusted, steered, or directed to alter its viewing orientation of the environment. To control the view captured by the adjustable camera(s) 11, the MVS 100 uses an audio-based locator 134 and/or a video-based locator 144 to determine locations of other possible conference participants and frame views of the environment and participants. Then the control module 120, operatively coupled to the audio and video modules 130/140, uses audio and/or video information from these locators 134/144 to send camera commands to the adjustable camera(s) 11 to alter its viewing orientation.

To determine the viewing orientation, the control module 120 as noted above uses audio information obtained from the audio-based locator 134 and/or video information obtained from the video-based locator 144. For example and as described in more detail below, the control module 120 uses audio information processed by the audio-based locator 134 from microphone 4 or 14. The control module 120 uses the determined location of the speech to then steer the adjustable camera(s) 11 toward that location so the camera 11 can capture video of a current speaker if desired.

MVS 100 can use spotter camera 13 to perform a number of useful functions. In particular, the spotter camera 13 can count the number of people in the near-end environment (e.g., disaster site) using person detection. In turn, the MVS 100 can use this information in tracking the participants and can forward this information to the far-end endpoints 104, to a multi-point control unit (not shown), or to some other device.

The MVS 100 can also use the spotter camera 13 to determine the dynamic environment of the videoconference. In particular, the MVS 100 can process video from the spotter camera 13 to frame the participants in the environment more effectively or to make optional close-up views on an active speaker. Moreover, the MVS 100 can process video from the spotter camera 13 so the MVS 100 can automatically control the viewing orientation of the adjustable camera(s) 11 to meet the conference's dynamic needs.

In one embodiment, the spotter camera 13 can be stationary with respect to the MVS, although an adjustable camera can be used. In general, the spotter camera 13 captures a wide, stationary view of the environment in contrast to the adjustable view obtained with the adjustable camera(s) 11. During the videoconference, the spotter camera 13 therefore captures wide-angle video of the environment, which gives context to the adjustable view of the adjustable camera(s) 11

Figure 2B:
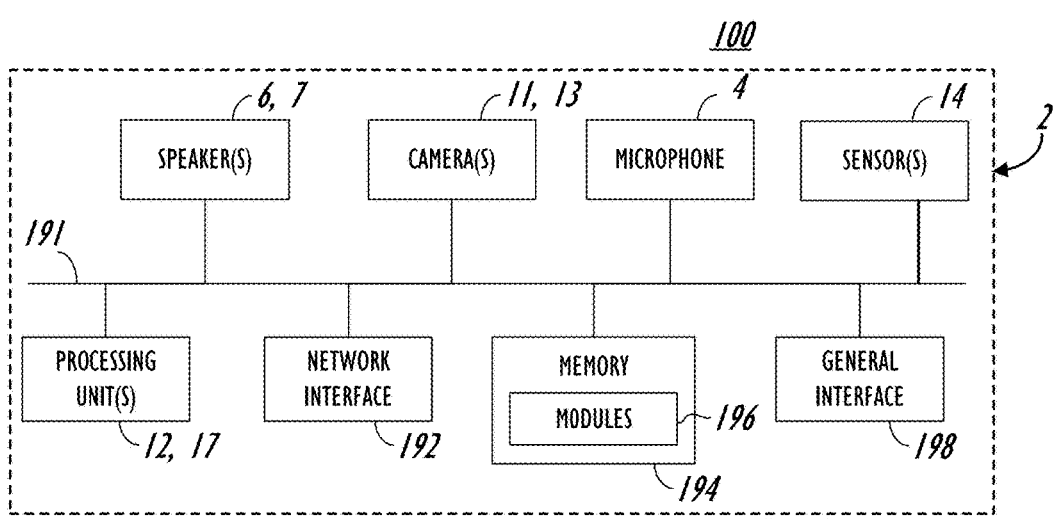
FIG. 2B is a second block diagram illustrating components a mobile wearable videoconferencing solution in accordance with an embodiment of this disclosure.

Having a general understanding of the MVS 100 and how the two cameras 11 and 13 can be used, discussion now turns to FIG. 2B to briefly discuss some exemplary components for the MVS 100. As shown and discussed above, the MVS 100 can include adjustable camera(s) 11, spotter camera 13, and at least one microphone 4. In addition to these, the MVS 100 has a processing unit 12, 17, a network interface 192, memory 194, and a general input/output (I/O) interface 198, which are all coupled via a bus 191. Each of these components can be on a single device or can be shared between separate devices depending on how the MVS 100 is implemented as discussed below.

The memory 194 can be any conventional memory such as SDRAM and can store modules 196 in the form of software and firmware for controlling the MVS 100. In addition to video and audio codecs and other modules discussed previously, the modules 196 can include operating systems, a graphical user interface (GUI) that enables users to control the MVS 100, and algorithms for processing audio/video signals and for controlling the adjustable camera(s) 11 as discussed later.

The network interface 192 provides communications between the MVS 100 and remote endpoints 104. By contrast, the general I/O interface 198 provides data transmission with local devices such as a connectable keyboard, mouse, printer, projector, extra display, external loudspeakers, additional cameras, or microphone pods, etc.

The cameras 11, 13, and 15, and the microphone 4, capture video and audio, respectively, in the videoconference environment and produce video and audio signals transmitted via the bus 191 to the processing unit 12, 17. Here, the processing unit 12, 17 processes the video and audio using algorithms in the modules 196. For example, the MVS 100 processes the audio captured by the microphone 4 as well as the video captured by the spotter camera device 13 to determine the location of participants and direct the adjustable camera(s) 11. Ultimately, the processed audio and video can be sent to local and remote devices coupled to interfaces 192/198.

Before turning to operation of the MVS 100 during a videoconference, discussion first turns to example implementations of the disclosed MVS 100. In general, the various modules (e.g., 120, 130, 140, 170) and components (e.g., 11, 13, 14, 15) of the MVS 100 can be implemented as one unit.

The spotter camera 13 captures video in a stationary (relative the MVS body 2), wide view of the videoconferencing environment. As such, the spotter camera 13 need not be designed or expected to move during the videoconference to obtain the view of the surrounding environment. Additionally, the spotter camera's captured video can be continuous video, intermittent video clips, or even video stills or frame, as processing capabilities may dictate. The video resolution of the spotter camera 13 is preferably high, such as 1080p or 720p. The frame rate of the spotter camera 13 can be low to reduce compute costs, and a low frame rate of less than 5 fps may be used. However, a higher frame rate is generally better for motion tracking if compute costs are not an issue. Still, the frame rate of the spotter camera 13 can still be low for use by a motion detection module (e.g., 196) and even a frame rate as low as 2 frames per second can be used, which may be a practical frame rate available in some implementations due to limited computing powers, limited data bandwidth, or other reason. Furthermore, the control unit(s) 12, 17 may be able to adjust the frame rate during processing depending on whether motion is to be used to track movements and whether compute resources are available.

By contrast, the adjustable camera(s) 11 is a controllable camera and is intended to obtain directed views of the videoconference environment. The adjustable camera(s) 11, therefore, has a video resolution and frame rate suitable for videoconferencing, which can be a video resolution up to 1920×1080 (1080p) resolution or 1280×720 (720p) up to 60 fps. The adjustable camera(s) 11 can have image processing components that can include an actuator if not an EPTZ camera, and the components can be operatively coupled to a local control unit housed in the MVS 100. More than one such adjustable camera can be implanted to capture multiple feeds, which can be combined for transmission to a remote location.

Figure 3:
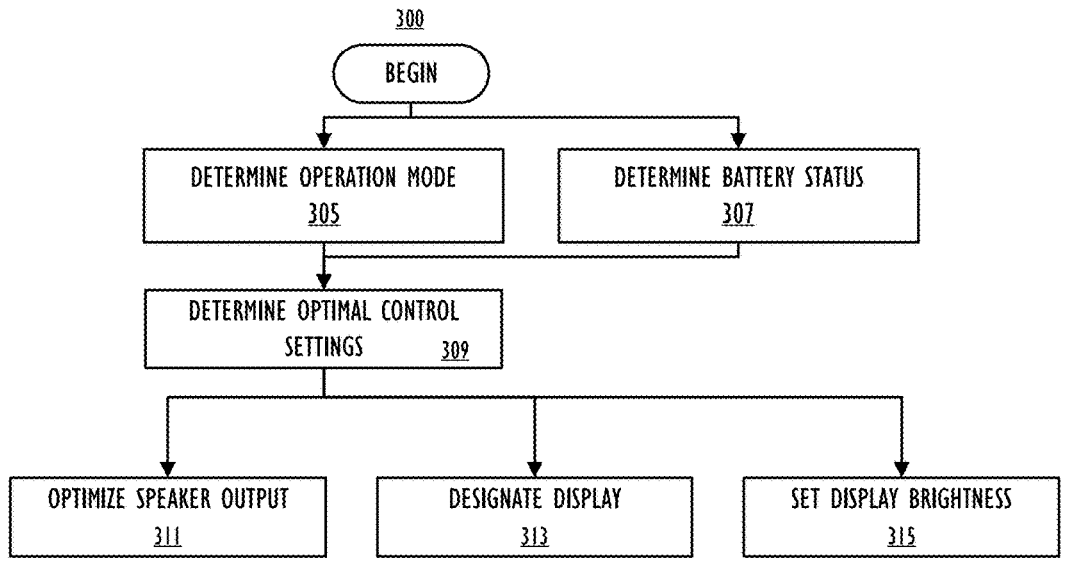
FIG. 3 illustrates a method of optimizing the operations of components of a mobile wearable videoconferencing solution in accordance with an embodiment of this disclosure.

FIG. 3 illustrates a method 300 of optimizing the operations of certain MVS 100 components including the speakers 6, 7 and the displays 16, 20. The method 300 begins by determining whether the MVS 100 is operating in a wearing mode (327) or a stand down mode (325), and determining 307 the status of the power source 14. Based on the operating mode 325, 327 and the status of the power source 14, the processing unit 12, 17 optimizes 311 speaker output, activates 313 the appropriate display 16, 20, and sets 315 the brightness level of designated display 16, 20.

Figure 4:
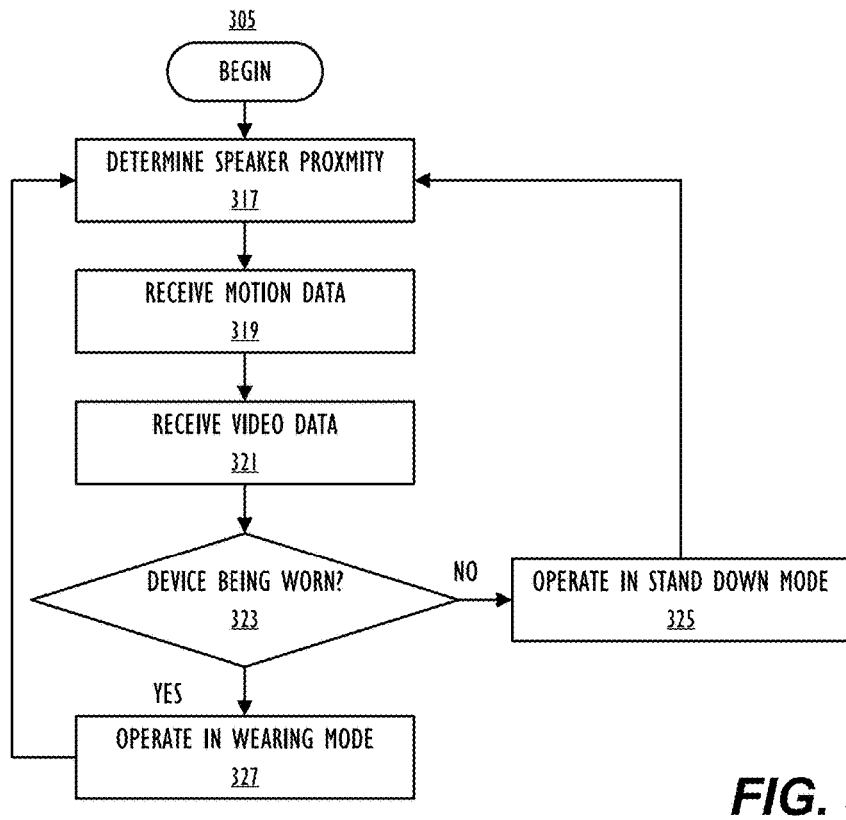
FIG. 4 illustrates a method of determining the operating mode of a mobile wearable videoconferencing solution in accordance with an embodiment of this disclosure.

FIG. 4 illustrates sub-process 305, which is a method of determining the operating mode of the MVS 100. The method 305 begins by determining 317 the proximity of a speaker. Motion data, if detected by motion sensor 14, can be received 319, and video data can be received 321 from cameras 16, 20. The mode selection method 305 then determines 323, based on this information, if the MVS 100 is being worn. If the MVS 100 is being worn, the MVS 100 will operate 327 in a wearing mode, otherwise the MVS 100 will operate 325 in a stand down mode.

Figure 5:
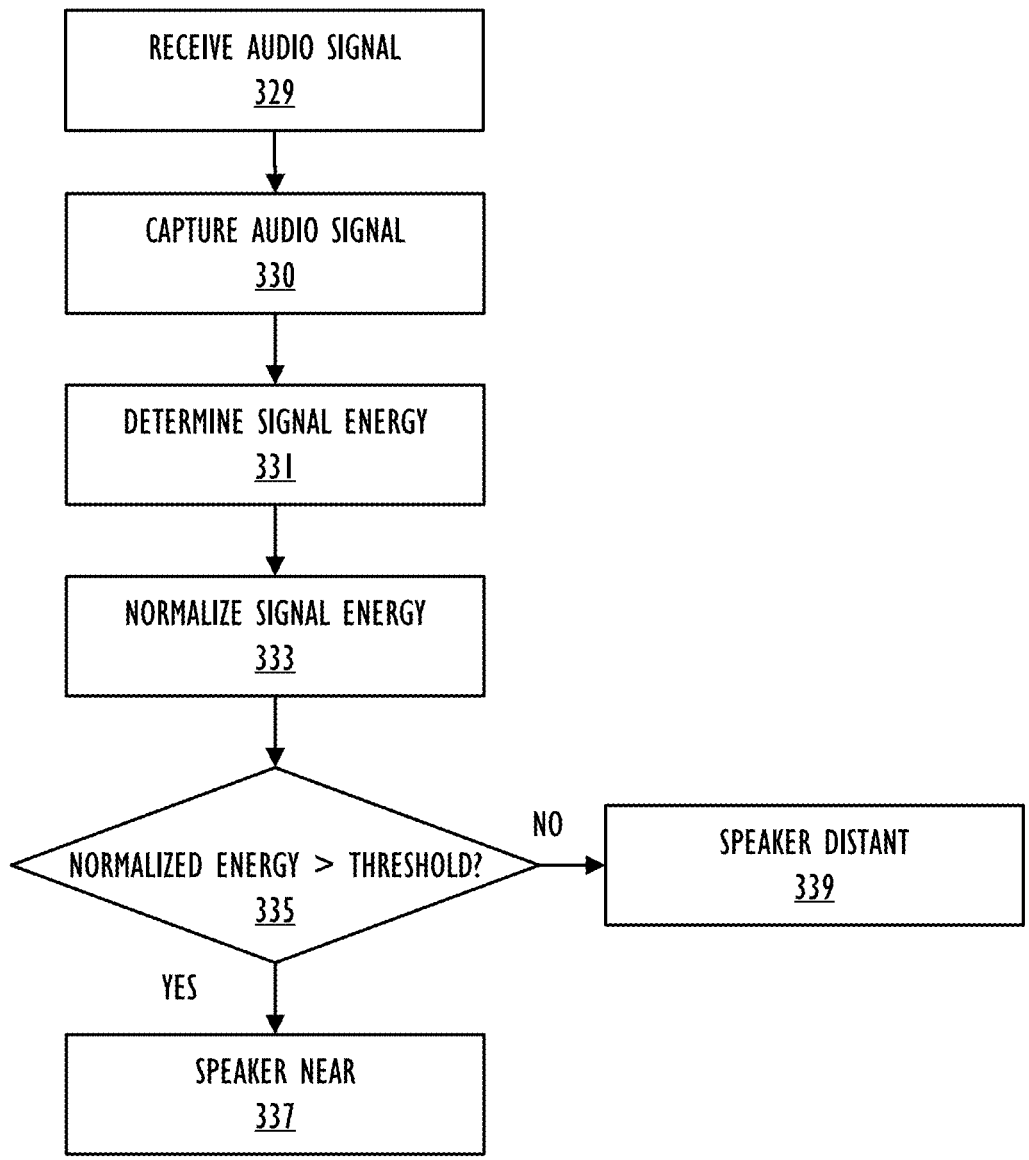
FIG. 5 method of determining a proximity of a speaker with respect to a mobile wearable videoconferencing solution in accordance with an embodiment of this disclosure.

FIG. 5 illustrates sub-process 317 which is a method of determining speaker proximity. Audio signal input is received 329 from microphone 4 and is captured 330 over a time window T. Further the energy content pf the signal is determined 331 as Ei, which is processed 333 to derive normalized signal energy En. The normalized signal energy En is compared 325 with a predefined threshold. If the value of En is greater than the threshold, the speaker is determined to be far away 339, otherwise the speaker is considered to be near.

One or more acts in accordance with method and process steps may be performed by a programmable control device such as control units 12, 17 executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Embodiments within this disclosure can include tangible and/or non-transitory computer-readable storage media such as memory 194 for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, or any other compact medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments involving many types of computer systems, including personal computers, hand-held devices, multi-processor systems, microprocessor-based or programmable consumer electronics, network PCs, mini-computers, mainframe computers, and the like.

The various embodiments described above are provided by way of illustration only, and should not be construed so as to limit the scope of the disclosure. Various modifications and changes can be made to the principles and embodiments described herein without departing from the scope of the disclosure. To aid the understanding of the technology set forth herein, a list of non-limiting example embodiments is provided below.

1. A wearable unified communication device comprising a body, a plurality of input devices removably attached to the body and coupled to at least one control unit, the plurality of input devices comprising at least one camera, at least one motion sensor, at least one microphone, and at least one power source configured to power the plurality of input devices.

2. The wearable unified communication device recited in example 1, further comprising at least one speaker, and at least two displays, the at least two displays configured to operate in an on-table mode and a wearing mode.

3. The wearable unified communication device recited in example 2, wherein at least one of the displays is mounted in non-obstructive way to enable simultaneous real life interactions and unified communication call involvement, and wherein the display employs a display surface near a user's right eye or left eye while minimally obstructing the user's field of view.

4. The wearable unified communication device recited in example 2, the device configured to determine the operating mode based, at least in part, on detected motion sensor data, and wherein at least one of the displays is active during the on-table mode, and an alternate display is active during the wearing mode.

5. The wearable unified communication device recited in example 2, wherein the control unit is configured to motion stabilize camera input signals using an optical stabilization technique.

6. The wearable unified communication device recited in example 2, further comprising a retractable camera cover cap, the retractable camera cover cap operable to mute audio and video pickup.

7. The wearable unified communication device recited in example 2, wherein the at least one camera is connected to the control unit by an extendable cable.

8. The wearable unified communication device recited in example 2, wherein the at least one camera is operable in a wide-angle mode, having a field of view exceeding 100 degrees, and a narrow-angle mode, having a field of view less than or equal to 100 degrees.

9. The wearable unified communication device recited in example 2, wherein the control unit is configured to determine a speaker's proximity based on speech energy detected by the at least one microphone, and determine the operating mode based, at least in part on the speech energy.

10. The wearable unified communication device recited in example 2, wherein the control unit is configured to enable and disable the at least one speaker and at least one microphone according to the determined operating mode.

11. The wearable unified communication device recited in example 2, wherein the control unit is configured to use motion sensor input and ambient audio input to perform auto volume gain for the at least one speaker.

12. The wearable unified communication device recited in example 2, wherein the at least one speaker is repositionable, and is configured to produce sound at a greater volume when in on-table mode than when in wearing mode.

13. The wearable unified communication device recited in example 12, wherein the at least one speaker is configured to switch automatically from a first volume to a second volume in accordance with the operating mode.

14. The wearable unified communication device recited in example 2, wherein the control unit is configured to switch a video call to an audio-only when energy stored in the power source falls below a predetermined threshold.

15. The wearable unified communication device recited in example 2, wherein the control unit is configured to determine speaker proximity based on speech energy received using the at least one microphone, and to determine operating mode based at least in part on the speaker proximity.

16. The wearable unified communication device recited in example 15, wherein the control unit is further configured to determine operating mode based at least in part on camera input data, motion sensor data, and speaker proximity.

17. The wearable unified communication device recited in example 2, wherein the control unit is configured to determine operating parameters of the at least one speaker, display and speaker, based at least in part on the operating mode and a charge level of the power source.

18. The wearable unified communication device recited in example 2, further comprising a laser unit coupled to the control unit and operable to illuminate distal scenes, thereby enabling the at least one camera to capture such scenes.

19. The wearable unified communication device recited in example 2, wherein the body of the wearable unified communication device is mountable on at least one of a shoulder, arm and wrist.

20. The wearable unified communication device recited in examples 1-19, further comprising an audio-visual transceiver coupled to the control unit and coupleable to one or more remote endpoints.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

The invention claimed is:

1. A wearable unified communication device having a stationary mode and a wearing mode, comprising:
a body;
a plurality of input devices removably attached to the body and coupled to a control unit, the plurality of input devices comprising a camera, a motion sensor, a microphone, and a power source configured to power the plurality of input devices; and
a speaker and two displays configured to alternately operate in accordance with the stationary mode and the wearing mode,
wherein the speaker is further configured to automatically increase operational volume responsive to switching from operating in accordance with the wearing mode to operating in accordance with the stationary mode, or automatically decrease operational volume responsive to switching from operating in accordance with the stationary mode to operating in accordance with the wearing mode.

2. The wearable unified communication device recited in claim 1, further comprising two speakers, and three displays, the three displays configured to operate alternately in accordance with the stationary mode and the wearing mode.

3. The wearable unified communication device recited in claim 1, wherein the body comprises headgear.

4. The wearable unified communication device recited in claim 1, wherein the control unit is configured to determine the operating mode based, at least in part, on detected motion sensor data, and wherein one of the displays is configured to be active when operating in accordance with the stationary mode, and another one of the displays is configured to be active when operating in the wearing mode.

5. The wearable unified communication device recited in claim 1, wherein the control unit is configured to motion-stabilize camera input signals using an optical stabilization technique.

6. The wearable unified communication device recited in claim 1, further comprising a retractable camera cover cap, the retractable camera cover cap operable to mute audio and video pickup.

7. The wearable unified communication device recited in claim 1, wherein the camera is connected to the control unit by an extendable cable.

8. The wearable unified communication device recited in claim 1, wherein the camera is operable in a wide-angle mode, having a field of view exceeding 100 degrees, and a narrow-angle mode, having a field of view less than or equal to 100 degrees.

9. The wearable unified communication device recited in claim 1, wherein the control unit is configured to detect speech energy using the microphone, and determine the operating mode based, at least in part, on the speech energy.

10. The wearable unified communication device recited in claim 9, wherein the control unit is configured to enable and disable the speaker and the microphone according to the determined operating mode.

11. The wearable unified communication device recited in claim 1, wherein the control unit is configured to automatically adjust gain of the speaker based on motion sensor input and ambient audio input.

12. The wearable unified communication device recited in claim 1, wherein the speaker is repositionable.

13. The wearable unified communication device recited in claim 1, wherein the body comprises a helmet.

14. The wearable unified communication device recited in claim 1, wherein the control unit is configured to switch a video call to an audio-only call when energy stored in the power source falls below a predetermined threshold.

15. The wearable unified communication device recited in claim 1, wherein the control unit is configured to determine talker proximity based on speech energy received using the microphone, and to determine the operating mode based, at least in part, on the talker proximity.

16. The wearable unified communication device recited in claim 15, wherein the control unit is further configured to determine the operating mode based, at least in part, on camera input data and motion sensor data.

17. The wearable unified communication device recited in claim 1, wherein the control unit is configured to determine operating parameters of at least one of the displays and the speaker, based, at least in part, on the operating mode and a charge level of the power source.

18. The wearable unified communication device recited in claim 1, further comprising a laser unit coupled to the control unit, the laser unit operable to illuminate distal scenes, and thereby enable the camera to capture such scenes.

19. The wearable unified communication device recited in claim 1, wherein the body is mountable on at least one of a shoulder, arm and wrist.

* * * * *